(12) United States Patent
Mathie et al.

(10) Patent No.: US 11,205,788 B2
(45) Date of Patent: Dec. 21, 2021

(54) FUEL CELL PURGE LINE SYSTEM

(71) Applicant: Ford Global Technologies, LLC, Dearborn, MI (US)

(72) Inventors: Craig Michael Mathie, White Lake Township, MI (US); William F. Sanderson, Commerce Township, MI (US); Virgo Edwards, Commerce Township, MI (US); Kurt David Osborne, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 738 days.

(21) Appl. No.: 15/298,666

(22) Filed: Oct. 20, 2016

(65) Prior Publication Data

US 2017/0040623 A1    Feb. 9, 2017

Related U.S. Application Data

(63) Continuation of application No. 13/793,132, filed on Mar. 11, 2013, now abandoned.

(51) Int. Cl.
*H01M 8/04* (2016.01)
*H01M 8/04089* (2016.01)
(Continued)

(52) U.S. Cl.
CPC ........ *H01M 8/04097* (2013.01); *H01M 8/04* (2013.01); *H01M 8/04164* (2013.01); *H01M 8/04231* (2013.01)

(58) Field of Classification Search
None
See application file for complete search history.

(56) References Cited

U.S. PATENT DOCUMENTS

| 6,432,568 | B1 | 8/2002 | Salvador et al. |
| 6,777,115 | B2 | 8/2004 | Reiser |
| | | (Continued) | |

FOREIGN PATENT DOCUMENTS

| JP | 2000030725 A | 1/2000 |
| JP | 2006032134 A | 2/2006 |
| | (Continued) | |

OTHER PUBLICATIONS

Yamagishi et al., JP-2009123517-A—machine translation.*
Meriam Webster Dictionary, URL: https://www.merriam-webster.com/dictionary/pipe.

*Primary Examiner* — Haixia Zhang
(74) *Attorney, Agent, or Firm* — Brooks Kushman P.C.

(57) ABSTRACT

A fuel cell system including a fuel cell stack, separator and a scavenging reservoir. The fuel cell stack is configured to generate water and reusable fuel. The separator is downstream of and in fluid communication with the fuel cell stack. The separator is configured to separate the water from the reusable fuel. The scavenging reservoir is downstream of and in fluid communication with the separator. The scavenging reservoir is configured to receive the water from the separator. The scavenging reservoir includes an inlet portion, an outlet portion, and a middle portion positioned between the inlet and outlet portions. The middle portion includes a reservoir and a passageway extending there between. The passageway is configured to allow a fluid stream to flow there through when the reservoir is occupied by a frozen fluid.

18 Claims, 3 Drawing Sheets

(51) Int. Cl.
    *H01M 8/04119*     (2016.01)
    *H01M 8/04223*     (2016.01)

(56) References Cited

U.S. PATENT DOCUMENTS

| | | |
|---|---|---|
| 6,815,103 B2 | 11/2004 | Abe et al. |
| 6,986,958 B2 | 1/2006 | Reiser et al. |
| 7,108,928 B2 | 9/2006 | Matsuoka |
| 7,172,827 B2 | 2/2007 | Scholta et al. |
| 7,335,435 B2 | 2/2008 | Yamada |
| 7,771,663 B2 | 8/2010 | Reiser et al. |
| 7,931,992 B2 | 4/2011 | Larrain et al. |
| 7,998,013 B2 | 8/2011 | Phillips et al. |
| 8,034,500 B2 | 10/2011 | Desrosiers et al. |
| 8,187,757 B2 | 5/2012 | Katano |
| 8,216,737 B2 | 7/2012 | Sommer et al. |
| 8,460,151 B2 | 6/2013 | Wittkopp et al. |
| 2001/0055707 A1 | 12/2001 | Roberts et al. |
| 2003/0190511 A1 | 10/2003 | Yoshizawa |
| 2004/0072052 A1 | 4/2004 | Yamamoto et al. |
| 2004/0081869 A1 | 4/2004 | Morishima et al. |
| 2005/0129992 A1 | 6/2005 | Busenbender |
| 2005/0202293 A1 | 9/2005 | Kagami et al. |
| 2007/0207362 A1 | 9/2007 | Koenekamp et al. |
| 2007/0243438 A1 | 10/2007 | Katano |
| 2008/0187793 A1 | 8/2008 | Owejan et al. |
| 2009/0110990 A1 | 4/2009 | Izutani et al. |
| 2009/0162730 A1 | 6/2009 | Ohira |
| 2010/0055523 A1 | 3/2010 | Ogawa et al. |
| 2010/0068565 A1 | 3/2010 | Yadha et al. |
| 2010/0112389 A1 | 5/2010 | Miyata et al. |
| 2010/0227230 A1 | 9/2010 | Goebel |
| 2010/0279188 A1 | 11/2010 | Miyauchi et al. |
| 2011/0033763 A1 | 2/2011 | Adcock et al. |
| 2011/0097637 A1 | 4/2011 | Ko et al. |
| 2011/0165488 A1 | 7/2011 | Janarthanam et al. |
| 2011/0195344 A1 | 8/2011 | Goebel et al. |
| 2011/0207012 A1 | 8/2011 | Frost et al. |
| 2011/0236778 A1 | 9/2011 | Buchinger et al. |
| 2011/0251014 A1 | 10/2011 | Leesch et al. |
| 2011/0281186 A1 | 11/2011 | Darling et al. |
| 2012/115056 A1 | 5/2012 | Meier |
| 2012/0165153 A1 | 6/2012 | Borgerson et al. |
| 2014/0255814 A1 | 9/2014 | Mathie et al. |

FOREIGN PATENT DOCUMENTS

| | | | |
|---|---|---|---|
| JP | 2009110840 A | | 5/2009 |
| JP | 2009123517 A | * | 6/2009 |
| JP | 2010080434 A | | 4/2010 |
| JP | 2011003447 A | | 1/2011 |
| KR | 20090003585 A | | 1/2009 |
| WO | 2008114120 A1 | | 9/2008 |
| WO | 2010066462 A1 | | 6/2010 |
| WO | 2013045044 A1 | | 4/2013 |

* cited by examiner

US 11,205,788 B2

FUEL CELL PURGE LINE SYSTEM

CROSS-REFERENCE TO RELATED APPLICATIONS

This application is a continuation of U.S. application Ser. No. 13/793,132 filed Mar. 11, 2013, now abandoned, the disclosures of which is hereby incorporated in its entirety by reference herein.

TECHNICAL FIELD

The present invention relates to a fuel cell purge line system.

BACKGROUND

During fuel cell operation, byproducts such as product water and nitrogen, as well as unconsumed hydrogen, may form at the anode side of a fuel cell stack. In certain known systems, accumulation of product water and nitrogen accumulation is controlled in an attempt to avoid a reduction in fuel cell performance, and/or fuel cell system shut down. One known approach is to release the water and nitrogen via a passageway downstream of the fuel cell stack. Using such approach, the passageway is coupled with a valve for the controllable release of water and nitrogen from the fuel cell stack. This approach causes the potential for problems to occur during cold weather operation of the fuel cell when water may freeze in the passageway, or valve, or other regions of the fuel cell with small cross sectional areas. The resulting ice formation may cause blockage of at least a portion of the passageway and prevent fluid flow (e.g., water and nitrogen removal), which may inhibit fuel cell system function.

SUMMARY

In one embodiment, a fuel cell system including a fuel cell stack, separator and a scavenging reservoir is disclosed. The fuel cell stack is configured to generate water and reusable fuel. The separator is downstream of and in fluid communication with the fuel cell stack. The separator is configured to separate the water from the reusable fuel. The scavenging reservoir is downstream of and in fluid communication with the separator. The scavenging reservoir is configured to receive the water from the separator. The scavenging reservoir includes an inlet portion, an outlet portion, and a middle portion positioned between the inlet and outlet portions. The middle portion includes a reservoir and a passageway extending there between. The passageway is configured to allow a fluid stream to flow there through when the reservoir is occupied by a frozen fluid.

In another embodiment, a fuel cell system including a fuel cell stack, a separator, and a scavenging reservoir is disclosed. The fuel cell stack is configured to generate water and reusable fuel and has a soak cycle. The separator is downstream of and in fluid communication with the fuel cell stack. The separator is configured to separate the water from the reusable fuel. The scavenging reservoir is downstream of and in fluid communication with the separator. The scavenging reservoir is configured to receive the water received from the separator. The scavenging reservoir includes an inlet portion, an outlet portion, and a middle portion positioned between the inlet and outlet portions. The middle portion includes a reservoir and a passageway extending there between. The passageway is configured to store the water received from the separator during the soak cycle to avoid a blockage of the fuel cell system during an attempted startup of the fuel cell system subsequent to the soak cycle.

In yet another embodiment, a fuel cell system that includes a fuel cell stack, a separator, and a scavenging reservoir. The fuel cell stack is configured to generate water and reusable fuel. The separator is downstream of and in fluid communication with the fuel cell stack. The separator is configured to separate the water from the reusable fuel. The scavenging reservoir is downstream of and in fluid communication with the separator. The scavenging reservoir is configured to receive the water from the separator. The scavenging reservoir includes an inlet portion, an outlet portion, and a horizontal middle portion positioned between the inlet and outlet portions. The inlet portion is angled upward at an inlet angle relative to the horizontal middle portion. The outlet portion is angled upward at an outlet angle relative to the horizontal middle portion. The horizontal middle portion includes a reservoir and a passageway extending there between. The passageway is configured to allow a fluid stream to flow there through when the reservoir is occupied by a frozen fluid.

DETAILED DESCRIPTION

Figure 1A:
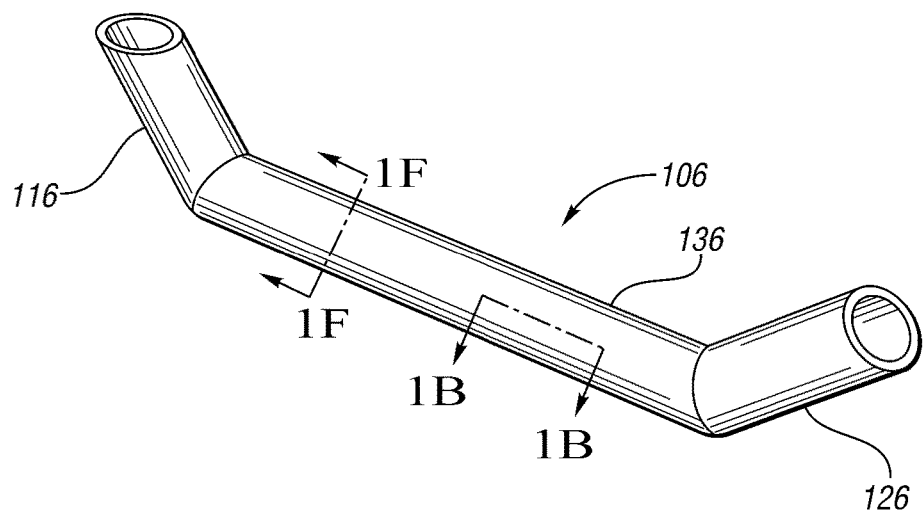
FIG. 1A depicts an isolated, perspective view of a scavenging reservoir in an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

During fuel cell operation, product water, residual fuel such as hydrogen, and byproducts such as nitrogen may accumulate at the anode side of the fuel cell stack. Attempts have been made to remove the liquid product water and byproducts and to reuse the residual hydrogen and water vapor. One approach is to collect those constituents in a separator downstream of the fuel cell stack, separate liquid water and direct it towards a combined purging and draining passageway, and return the remaining constituents to the fuel cell stack via a return passageway. The combined purging and draining passageway is closed to the atmosphere by a single valve. Periodically, this valve is opened to drain liquid product water and purge the anode of byproducts such as nitrogen. However, combining the purging and draining functions into a single passageway closed by a single valve presents significant risk of ice formation and blockage of purge and drain flow when residual product water freezes during exposure to cold ambient temperatures. The potential for ice formation is acute concern in cold ambient temperatures below 0° C. If the purging and draining functions are inhibited by ice blockage, then fuel cell system performance degrades, potentially to the point of system shut down.

The embodiments of the present invention, as will be described herein, provide a solution to one or more of the above-identified problems. One or more embodiments delivers a reduction in system complexity by incorporating new structures into an existing purge passageway, avoiding the use of multiple valves and passageways for startup robustness, therefore keeping hardware and control software to a minimum. Reduction in complexity may result in a reduction in manufacturing cost, a reduction in system weight, and/or a reduction in failure mode occurrence.

In one or more embodiments, a fuel cell system with a scavenging reservoir positioned downstream of a fuel cell stack is disclosed. The scavenging reservoir may provide one or more of the following benefits: (1) a reduction and/or elimination of purging passageway blockage due to ice formation and (2) a reduction in the number of valves for purging both nitrogen and water. In certain instances, nitrogen, water, and hydrogen may flow through the same passageway employing the scavenging reservoir with a single downstream valve. This approach may be alternatively referred to as an integrated purge and drain function. This approach supports the endeavor of obtaining a commercially-viable fuel cell system design that is capable of consistently starting in freezing ambient conditions while reducing costs and improving efficiency. In addition, and as detailed herein, the product water is less of a threat for causing ice blockage during cold weather conditions.

Figure 1B:
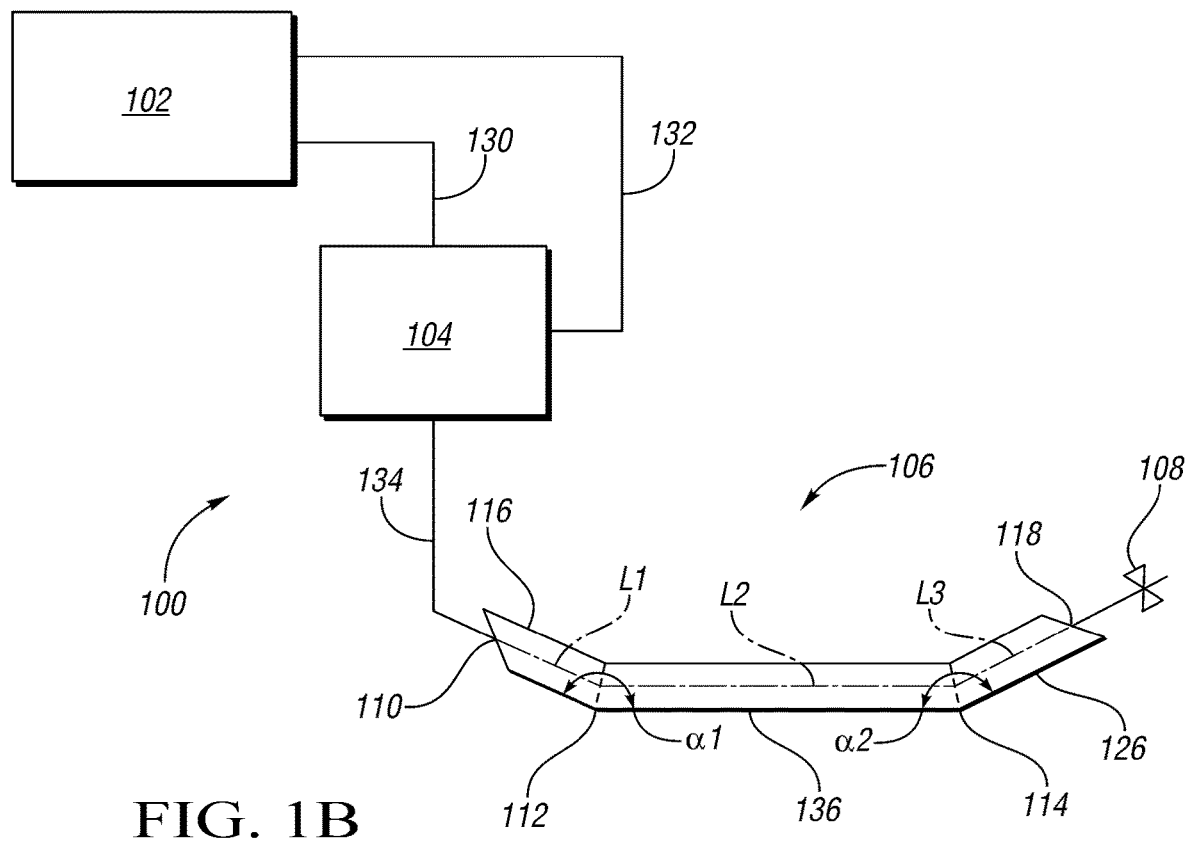
FIG. 1B depicts a schematic drawing of a fuel cell system and a cross-sectional view of the scavenging reservoir of FIG. 1A taken along line 1B-1B.

In one or more embodiments, and as depicted in FIGS. 1A and 1B, a fuel cell system generally shown at 100 may include a fuel cell stack 102, a separator 104 downstream of and in fluid communication with the fuel cell stack 102 via a passageway 130, and a scavenging reservoir 106 downstream of and in fluid communication with the separator 104, wherein the scavenging reservoir 106 includes an inlet portion 116, an outlet portion 126, and a middle portion 136 positioned between the inlet and outlet portions 116, 126. The lower surface of inlet portion 116 is positioned with an inlet angle $\alpha 1$ relative to the lower surface of the middle portion 136. The lower outlet portion 126 is positioned with an outlet angle $\alpha 2$ relative to the lower surface of the middle portion 136. Valve 108 is positioned downstream of the reservoir 106. As described herein, this structure of the scavenging reservoir 106 may maintain a passageway during cold weather conditions and keep the passageway valve free of ice blockage.

During fuel cell system operation, product water, nitrogen, and residual hydrogen may flow from the fuel cell stack 102 into the separator 104 via the passage 130. In the separator 104, the product water is separated from the residual hydrogen and nitrogen. The product water exits the separator 104 through passage 134. In certain instances, and as depicted in FIG. 1B, the separated hydrogen may be returned back to the fuel cell stack 102 via a hydrogen return passageway 132.

In one non-limiting embodiment, the scavenging reservoir 106 can be formed as a detachable unit with dimensions that comply to any fuel cell system where water freeze may be an issue. The scavenging reservoir can also be incorporated into the bottom of the water knockout itself. The scavenging reservoir may be an integral single unit, optionally formed via injection molding. A benefit of this configuration is that preferred liquid leakage may be reduced at the angled and tapered sections, which may otherwise require welding and/or soldering to connect. However, the inlet, outlet and middle portions can be connectable pieces with sizes and materials separately customizable for each fuel cell system. For instance, the middle portion may have a cross-sectional diameter greater than, equal to or smaller than that of either of the inlet portion and the outlet portion. For instance also, one may choose to have a middle portion formed of a material different from that of either of the inlet portion and the outlet portion.

By reducing the total number of valves to one, which is the combined purge and drain valve 108, and by employing the scavenging reservoir 106 upstream of the valve 108, the present invention in one or more embodiments provides a synergistic effect of preventing ice blockage and scavenging product water.

In one or more embodiments, the term "scavenging" may refer to the act of flowing the anode purge and drain gas stream over and through the accumulated liquid water to physically remove the water.

The scavenging reservoir 106 may be in fluid communication with an anode of the fuel cell stack 102 or a cathode of the fuel cell stack 102. When used in fluid communication with the cathode, the scavenging reservoir 106 may help prevent items such as an electronic throttle body from freezing.

The scavenging reservoir 106 and more particularly the middle portion 136 thereof is positioned below the separator 104 along the direction of gravity so that water can drain via gravity into the scavenging reservoir 106. Along this passageway, a valve 108 positioned downstream of the scavenging reservoir 106 should be at a position above the scavenging reservoir 106 along the direction of gravity so that any water which would otherwise reside on or around the valve 108 would then accumulate in the middle portion 136. The water should accumulate in the middle portion 136 in such a manner as to permit gas passage through the middle portion 136, even if any accumulated water forms ice. The valve 108 can be a closed solenoid valve.

Figure 1C:
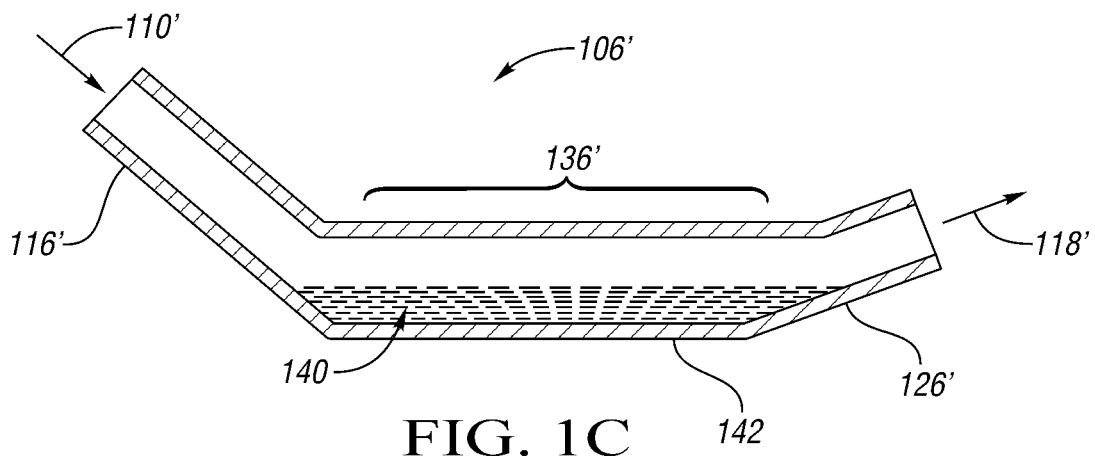
FIG. 1C depicts a longitudinal cross-sectional view of an alternative scavenging reservoir according to another embodiment.
Figure 1D:
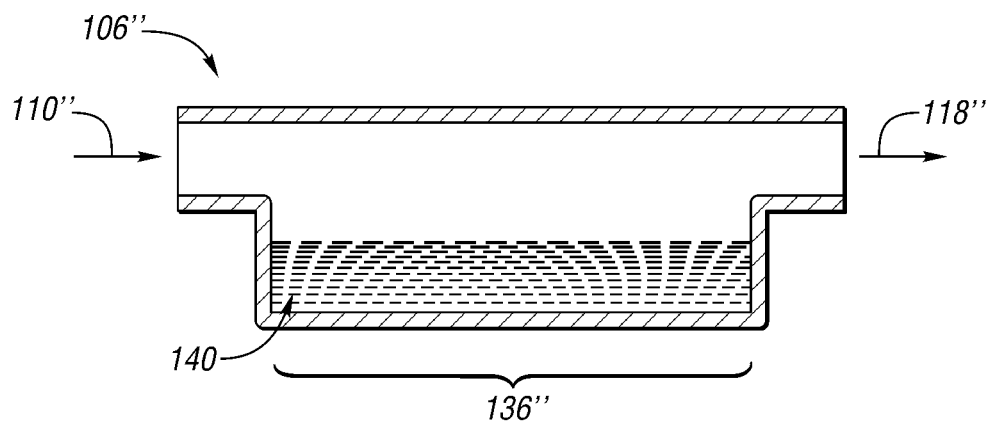
FIG. 1D depicts a longitudinal cross-sectional view of a scavenging reservoir according to yet another embodiment.
Figure 1E:
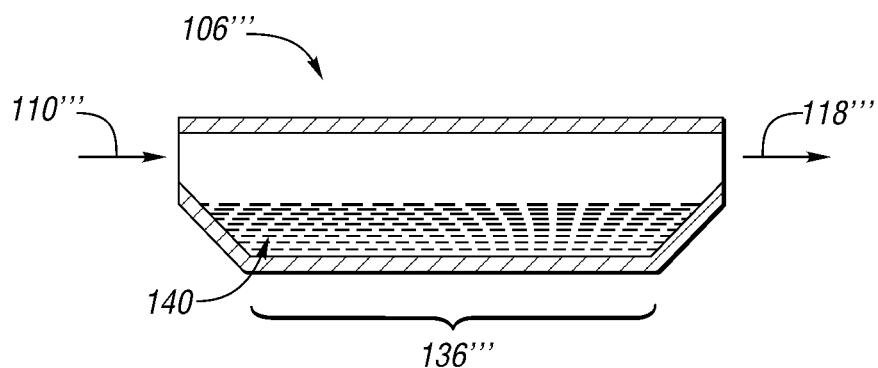
FIG. 1E depicts a longitudinal cross-sectional view of a scavenging reservoir according to a further embodiment.

FIG. 1C depicts a scavenging reservoir 106' showing water or ice 140 accumulated on the lower surface 142 of the middle portion 136', with a clear flow path above the water or ice accumulation. During nitrogen purging and water draining events, the flow of warm anode byproducts melts ice and entrains liquid water accumulated in the middle portion 136'. In this configuration, the product water and nitrogen gas can be purged substantially evenly in the presence of ice in the passageway. This design, therefore, provides a synergistic effect in that not only the nitrogen gas and the product water can be purged via a single passageway with a single downstream valve to reduce system complexity and maintenance cost, but also provides built-in warming and melting effectuated via the fluid mixture passing through the scavenging reservoir 106'. FIGS. 1D and 1E depict scavenging reservoirs 106" and 106''' according to alternative embodiments of the present invention. Referring to FIGS. 1D and 1E, the inlet end 110" and 110''' may be substantially circular or nearly circular that transitions into the reservoir 106" or 106''' respectively. As shown here, the 106" reservoir of FIG. 1D has a nearly rectangular reservoir cross-sectional middle portion 136", wherein the transition from the inlet end 110" is not a gradual transition into the middle portion 136". While FIG. 1E depicts the reservoir 106''' with a gradual decline transition from the inlet end 110''' into the middle portion 136'''.

Several factors can be considered in shaping the scavenging reservoir. These factors may include designing the inlet and outlet angles, the inlet, outlet, and reservoir cross sectional areas, and the length, width, and depth of each section of the scavenging reservoir in response to flow stream characteristics, which in themselves are a function of load as dictated by usage cycle. In general, the scavenging reservoir should be designed with dimensions effectuating sufficient storage of product water during a soak to avoid system blockage upon a subsequent start up attempt. In certain embodiments, the angles of the inlet to and outlet from the reservoir should be upward to facilitate gravity drainage of water into the reservoir for storage and freezing. Moreover, the position of the water and anode knock-out purge line installed in a vehicle should also take into consideration road pitch. For example, the angles of the inlet to and outlet from the reservoir should be great enough to overcome road pitch ±17° to facilitate gravity drainage of water into the reservoir for storage and freezing. Those skilled in the art know that road pitch may deviate greatly from being nearly planar to mountainous roads having steep inclines and declines which may exceed ±3°, ±5°, ±8°, ±11°, ±15°, ±18°, ±21°, and ±25°, to which the angles of the inlet to and outlet from the reservoir should be great enough to overcome.

The inlet portion, the outlet portion and/or the middle portion can each be structured with any suitable geometrical features, including ribbing and vanes, which may straighten or direct fluid flow, or even add turbulence to the fluid flow. Such manipulation of the fluid flow may enhance scavenging during operation, or could be used to direct water flow during non-operation prior to freezing.

The water should accumulate entirely or significantly in the middle portion 136 in such a manner as to permit gas passage through the middle portion 136 even if any accumulated water forms ice.

Referring back to FIG. 1B, the inlet portion 116 may be configured as a substantially cylindrical or cylindrical structure including a first end 110 and a second end 112, with an inlet length Ln1 measured down the centerline axis L1. In certain embodiments, the inlet length Ln1 of the inlet portion 116 has a value of 0.5 to 10 inches, 1.0 to 5 inches, or 2.0 to 3.0 inches.

Referring to FIG. 1B, the inlet angle $\alpha 1$ may be an angle defined by a longitudinal cross-sectional lower surface of the inlet portion 116 and a longitudinal cross-sectional lower surface of the middle portion 136.

As shown in FIG. 1B, the outlet angle $\alpha 2$ may be an angle defined by longitudinal cross-sectional lower surface of the middle portion 136 and a longitudinal cross-sectional lower surface of the outlet portion 126.

In certain embodiments, the combination of centerline axes L1, L2 and L3 constitutes a longitudinal axis of the scavenging reservoir. Further, the cross-sectional views of the scavenging reservoirs 106, 106', 106" and 106''' depicted in FIGS. 1B, 1C, 1D, and 1E, respectively, may be considered latitudinal cross-sectional views.

The inlet angle $\alpha 1$ may be greater than about 90 degrees and smaller than about 155.5 degrees. In certain instances, the inlet angle $\alpha 1$ is between about 100 to about 155.5 degrees, about 120 to about 155.5 degrees, about 130 to about 155.5 degrees, or about 140 to about 155.5 degrees.

The outlet angle $\alpha 2$ may be greater than about 90 degrees and smaller than about 155.5 degrees. In certain instances, the outlet angle $\alpha 2$ is between about 100 to about 155.5 degrees, about 120 to about 155.5 degrees, about 130 to about 155.5 degrees, or about 140 to about 155.5 degrees.

The inlet angle $\alpha 1$ and/or the outlet angle $\alpha 2$ may be configured to facilitate directing water into the middle portion 136 during soak events. This helps to permit ice to form in the middle portion 136 and away from passageways that may be relatively more sensitive to bridging and blockage.

This paragraph relates to the installation of the combined water and anode knock-out purge line in a fuel cell within a vehicle. The centerline axis L2 of the middle portion 136 can be positioned relative to the direction of gravity at an angle of about 65.5 to about 114.5 degrees, about 70 to about 110 degrees, or about 85 to about 95 degrees. The middle portion 136 as positioned in relation to the inlet portion 116 and the outlet portion 126 is to provide a platform for water to reside on a bottom surface of the middle portion 136, leaving an upper space for gas flow. In certain particular instances, the middle portion 136 can be essentially positioned flat, for instance, in an angle of about 88.5 to about 91.5 degrees relative to the direction of gravity, to collect as much water as possible.

Figure 1F:
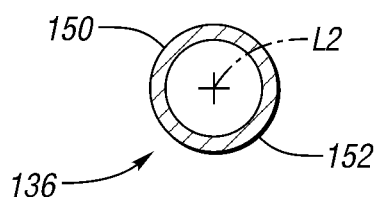
FIG. 1F depicts a cross-sectional view of the scavenging reservoir of FIG. 1A taken along line 1F-1F.

Referring to FIGS. 1B and 1F, the middle portion 136 may be configured as substantially cylindrical or a cylindrical structure including a centerline axis L2 and defined between the second end 112 and a third end 114. The cylindrical structure shown in 1F depicts a lower surface 152 and upper surface 150. The middle portion 136 may have a length Ln2 measured down the centerline axis L2 and ending between the second and third ends 112, 114. In certain designs, the length Ln2 of the middle portion 136 has a value of 0.5 to 10 inches, 1.0 to 5 inches, or 2.0 to 3.0 inches. In one or more embodiments, the middle portion length Ln2 is configured such that scavenging water is not dropped out of the purge and drain flow stream and back into the reservoir before reaching the outlet portion (in this case, the middle portion would be too long).

Figure 3A:
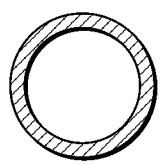
FIG. 3A depicts a variation cross-sectional view of a scavenging reservoir.
Figure 3B:
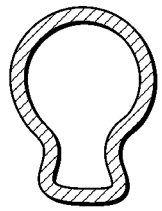
FIG. 3B depicts a variation cross-sectional view of a scavenging reservoir.
Figure 3C:
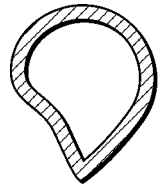
FIG. 3C depicts a variation cross-sectional view of a scavenging reservoir.
Figure 3D:
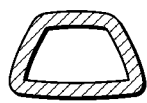
FIG. 3D depicts a variation cross-sectional view of a scavenging reservoir.
Figure 3E:
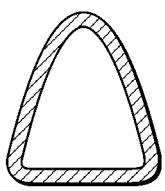
FIG. 3E depicts a variation cross-sectional view of a scavenging reservoir.
Figure 3F:
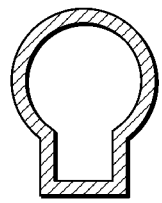
FIG. 3F depicts a variation cross-sectional view of a scavenging reservoir.
Figure 3G:
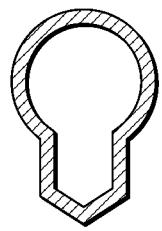
FIG. 3G depicts a variation cross-sectional view of a scavenging reservoir.

In alternative embodiments, referred to in FIGS. 3A-3G, the middle portion 136 may be configured in various shapes construed or varying longitudinal cross-sectional shapes suitable with dimensions effectuating sufficient storage of product water during a soak to avoid system blockage upon a subsequent start up attempt. FIGS. 3A-3G represent alternative embodiments which the angles of the inlet to and outlet from the reservoir are upward to facilitate gravity drainage of water into the reservoir for storage and freezing. FIGS. 3A-3G depict a variation of cross-sectional views of the scavenging reservoir of FIG. 1A taken along line 1F-1F, wherein FIG. 3A is circular or substantially circular, FIGS. 3B-3G have a drainage reservoir that allows gravity drainage of water into the reservoir for storage and freezing. FIGS. 3B-3G may be turned relative to a central point fixed axis, in 15°, 30°, 45°, 60°, 75°, 90°, 105°, 120°, 135°, 150°, 165°, and 180°.

The outlet portion 126 may be configured as a substantially cylindrical structure or cylindrical including a centerline axis L3 and defined between the third end 114 and a fourth end 118. The outlet portion 126 may have a length Ln3 measured down the centerline axis L3 and ending between the third and fourth ends 114, 118. In certain designs, the length Ln3 of the outlet portion 126 has a value of 0.5 to 10 inches, 1.0 to 5 inches, or 2.0 to 3.0 inches. Without wanting to be limited to any particular theory, the outlet portion 126 is configured such that scavenging water is not dropped back into the reservoir before reaching the purge and drain valve.

When the inlet portion is cylindrical or substantially cylindrical, the inlet portion 116 may have an average diameter of 5 to 20 mm, 7.5 to 17.5 mm, or 10 to 15 mm. In one or more embodiments, the inlet portion length Ln1 creates directionality to the fluid flow, imparting flow separation between the terminus of the inlet portion and the top of the middle portion and resulting in the fluid flow impacting the lowest inner surface of the middle portion. This action causes scavenging of the pool of water. In other embodiments, inlet portion 116 may be conical or frusto-conical tapered from a large base at 110 to the smaller base at 112.

The middle portion 136 may be cylindrical or substantially cylindrical, or any other suitable cross-section, such as rectangular or polygonal. When the inlet portion is cylindrical or substantially cylindrical, the middle portion 136 has an average diameter of about 12.5 to about 55 mm, about 40 mm, about 30 mm, about 25 mm, about 20 mm, about 15 to about 25 mm, or about 17.5 to about 22.5 mm. The middle portion 136 may be configured to have an average diameter greater than that of the inlet portion 116 and/or the outlet portion 126. The difference in average diameter values can be about 2 to about 11 mm, about 3 to about 10 mm, about 4 to about 9 mm, or about 5 to about 8 mm. These diameters may be configured such that a single droplet of water would not bridge or completely block a passageway due to capillary forces.

Figure 2:
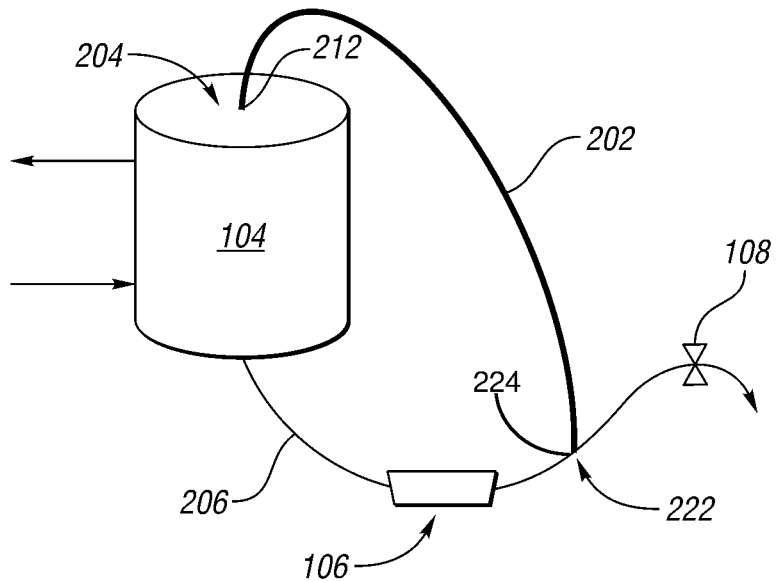
FIG. 2 depicts a variation of the fuel cell system referenced in FIG. 1B including a supplemental purge passageway.

As depicted in FIG. 2, the fuel cell system may further include a supplemental purge passageway 202 to provide purging supplemental to that provided by the primary purge passageway where the scavenging reservoir 106 resides. The supplemental purge passageway may include a first end 212 and a second end 222, the first end 212 being connected to and/or received within a top portion 204 of the separator 104, the second end 222 being disposed upstream of the valve 108. In certain instances, the supplemental purge passageway 202 is connected to the primary purge passageway 206 at junction 224, wherein the second end 222 is disposed downstream of the scavenging reservoir 106 and upstream of the valve 108.

The incoming flow may include water in liquid and/or vapor states, hydrogen, and nitrogen, and the incoming flow passes through the primary and/or supplemental purge passageway in various concentrations. The extent of a flow through the supplemental purge passageway can be controlled such that the supplemental purge passageway may come into effect only when the primary purge passageway fails to provide the requisite amount of purging as desirable. This control can be done in a variety of ways, including the employment of a restriction device such as an orifice to restrict the flow through the supplemental purge passageway 202 or a valve such as a solenoid valve.

As depicted in FIG. 1B and FIG. 2, although the supplemental purge passageway 202 is separately disposed relative to the primary purge passageway, the supplemental purge passageway 202 may feed the same valve 108 used by the primary purge passageway, thereby keeping costs and parasitic losses low.

Referring back to FIG. 1B, the middle portion 136 of the scavenging reservoir 106 remains the lowest region in the primary purge passageway relative to the passageway's origination from the separator 104. Referring back to FIG. 2 also, the middle portion 136 of the scavenging reservoir 106 remains the lowest spot in the primary purge passageway relative to the second end 222 of the supplemental purge passageway 202. This relatively low region provides a region for water to accumulate away from areas that are sensitive to blockage from ice formation, such as the merge location (e.g., the second end 222) of the primary and supplemental passageways, or the orifice in the valve 108.

The supplemental purge passageway 202 is provided such that it originates at a location on top of the separator 104 that permits gas flow in the presence of ice blockages in the primary passageway. Passageway 202 merges with the primary passageway prior to the location upstream of the valve 108. The origination at the separator 104 may prevent accumulation of liquid water that could later freeze. The supplemental purge passageway 202 may contain an orifice (not shown) in the flow path to restrict fluid flow, ensuring that the majority of the purge and drain fluids flow through the primary passageway unless the primary is blocked or restricted by liquid water or ice.

Therefore, the supplemental purge passageway 202 serves as a bypass loop that will enable purge flow in the event that the primary purge passageway is blocked with ice until the primary purge passageway is thawed and able to flow both purge and drain fluids. In this arrangement the valve 108 must be located such that it is not the lowest component in the entire system to prevent it from being subjected to ice blockage.

In certain designs, the primary and secondary passageways can be formed out of a conductive material and be placed wholly or partially within another system pipe that carries warm gases or fluids, such as the cathode exhaust passageway coming out of the stack or a pipe carrying warm stack outlet coolant. In this manner, the passageways will be latently warmed by their surroundings, efficiently thawing any ice using waste heat. Suitable conductive materials include, but not limited to metal, copper, aluminum, composites, and the like.

In certain other designs, a heat source may be placed in close communication with the primary and secondary passageways to promote ice melt.

In certain other designs, the primary and the secondary passageways may be insulated wholly or partially to promote ice melt by prevention of heat loss.

In certain other designs, a water-vapor-permeable but water-liquid-impermeable membrane may be placed in the bypass purge passageway to keep liquid water out of the passageway to prevent ice blockage.

Having generally described several embodiments of this invention, a further understanding can be obtained by reference to certain specific examples which are provided herein for purposes of illustration only and are not intended to be limiting unless otherwise specified.

Examples

A sample scavenging reservoir is formed according to the configuration shown in FIGS. 1A and 1B. The sample scavenging reservoir as formed has the following dimensions: an inlet portion length of 63.5 mm, an inlet portion average diameter of 12.7 mm, $\alpha 1$ of 147 degrees, a middle portion length of 54.0 mm, a middle portion average diameter of 19.1 mm, $\alpha 2$ of 155.5 degrees, an outlet portion length of 41.3 mm, and an outlet portion average diameter of 12.7 mm.

A prototype supplemental purge passageway built according to FIG. 2 demonstrates acceptable purging performance during cold soaks, maintaining an open purge flow path without the need for multiple valves, for the next freeze start.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
a fuel cell stack configured to generate liquid water and reusable fuel gas and including an anode and a cathode;
a fuel cell passage in fluid communication with a fuel cell stack and a separator;
the separator downstream of and in fluid communication with the fuel cell stack, the separator configured to separate the liquid water from the reusable fuel gas, the fuel cell passage being downstream of the fuel cell stack and upstream of the separator;
a separator passage downstream of the separator, the separator passage in fluid communication with the separator and a scavenging reservoir, the separator passage configured to receive the liquid water from the separator;
the scavenging reservoir downstream of and in fluid communication with the separator passage, the scavenging reservoir configured to receive the liquid water from the separator passage, the separator passage is configured to deliver the liquid water to the scavenging reservoir, the separator passage being upstream of the scavenging reservoir, the scavenging reservoir including an inlet portion is an elongated, cylindrical structure, an outlet portion, and a middle portion positioned between the inlet and outlet portions, the middle portion including a collection reservoir and a passageway extending there between, the passageway configured to allow a stream of a purge gas to flow there through when the collection reservoir is occupied by ice from the liquid water, the purge gas entraining a byproduct from the anode; and
a combined valve downstream of and in fluid communication with the scavenging reservoir and configured to open during a purge cycle to drain the liquid water and to purge the stream of the purge gas from the passageway.

2. The fuel cell system of claim 1, wherein the scavenging reservoir is in fluid communication with the anode of the fuel cell stack.

3. The fuel cell system of claim 1, wherein the inlet portion angled upward at an inlet angle relative to the middle portion, and the outlet portion angled upward at an outlet angle relative to the middle portion.

4. The fuel cell system of claim 1, wherein the scavenging reservoir is situated below the separator.

5. The fuel cell system of claim 1, wherein the middle portion is a horizontal middle portion.

6. The fuel cell system of claim 1, wherein the byproduct is nitrogen.

7. A fuel cell system comprising:
a fuel cell stack configured to generate liquid water and reusable fuel gas and to have a soak cycle and including an anode and a cathode;
a fuel cell passage in fluid communication with the fuel cell stack and a separator;
the separator downstream of and in fluid communication with the fuel cell stack, the separator configured to separate the liquid water from the reusable fuel gas, the fuel cell passage being downstream of the fuel cell stack and upstream of the separator;
a separator passage downstream of the separator, the separator passage in fluid communication with the separator and a scavenging reservoir, the separator passage configured to receive the liquid water from the separator;
the scavenging reservoir downstream of and in fluid communication with the separator passage, the scavenging reservoir configured to receive the liquid water received from the separator passage, the separator passage is configured to deliver the liquid water to the scavenging reservoir, the separator passage being upstream of the scavenging reservoir, the scavenging reservoir including an inlet portion is an elongated, cylindrical structure, an outlet portion, and a middle portion positioned between the inlet and outlet portions, the middle portion including a collection reservoir and a passageway extending there between, the collection reservoir configured to store ice from the liquid water received from the separator during the soak cycle to avoid a blockage of the fuel cell system during an attempted startup of the fuel cell system subsequent to the soak cycle, the passageway configured to allow a stream of purge gas to flow there through when the collection reservoir stores the ice from the liquid water, the purge gas entraining a byproduct from the anode; and
a combined valve downstream of and in communication with the scavenging reservoir and configured to open during a purge cycle to drain the liquid water and to purge the stream of the purge gas from the passageway.

8. The fuel cell system of claim 7, wherein the scavenging reservoir is in fluid communication with the anode of the fuel cell stack.

9. The fuel cell system of claim 7, wherein the inlet portion angled upward at an inlet angle relative to the middle portion, and the outlet portion angled upward at an outlet angle relative to the middle portion.

10. The fuel cell system of claim 7, wherein the scavenging reservoir is situated below the separator.

11. The fuel cell system of claim 7, wherein the middle portion is a horizontal middle portion.

12. The fuel cell system of claim 7, wherein the byproduct is nitrogen.

13. A fuel cell system comprising:
a fuel cell stack configured to generate liquid water and reusable fuel gas and including an anode and a cathode;
a fuel cell passage in fluid communication with the fuel cell stack and the separator;
the separator downstream of and in fluid communication with the fuel cell stack, the separator configured to separate the liquid water from the reusable fuel gas, the fuel cell passage being downstream of the fuel cell stack and upstream of the separator;
a separator passage downstream of the separator, the separator passage in fluid communication with the separator and a scavenging reservoir, the separator passage configured to receive the liquid water from the separator;
the scavenging reservoir downstream of and in fluid communication with the separator passage, the scavenging reservoir configured to receive the liquid water from the separator passage, the separator passage is configured to deliver the liquid water to the scavenging reservoir, the separator passage being upstream of the scavenging reservoir, the scavenging reservoir including an inlet portion is an elongated, cylindrical structure, an outlet portion, and a horizontal middle portion positioned between the inlet and outlet portions, the inlet portion angled upward at an inlet angle relative to the horizontal middle portion, and the outlet portion angled upward at an outlet angle relative to the horizontal middle portion, the horizontal middle portion including a collection reservoir and a passageway extending there between, the passageway configured to allow a stream of purge gas to flow there through when the collection reservoir is occupied by ice from the liquid water; and
a combined valve downstream of and in fluid communication with the scavenging reservoir and configured to open during a purge cycle to drain the liquid water and to purge the stream of the purge gas from the passageway.

14. The fuel cell system of claim 13, wherein the outlet angle is greater than about 90 degrees and less than about 155.5 degrees.

15. The fuel cell system of claim 13, wherein the inlet angle is greater than about 90 degrees and less than about 155.5 degrees.

16. The fuel cell system of claim 13, wherein the outlet angle is at least enough to overcome a road pitch of ±21 degrees.

17. The fuel cell system of claim 13, wherein the inlet angle is at least enough to overcome a road pitch of ±21 degrees.

18. The fuel cell system of claim 13, wherein the horizontal middle portion extends horizontally from the inlet portion to the outlet portion.

* * * * *